J. MUSGRAVE.
Seed Planter.
No. 84,751.  Patented Dec. 8, 1868.
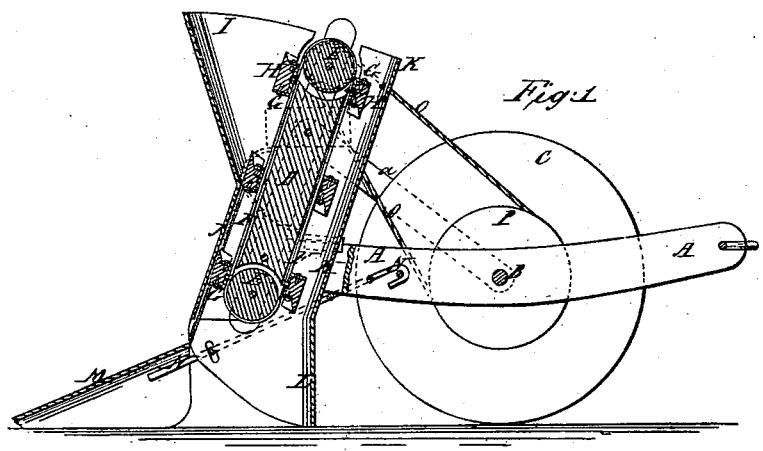
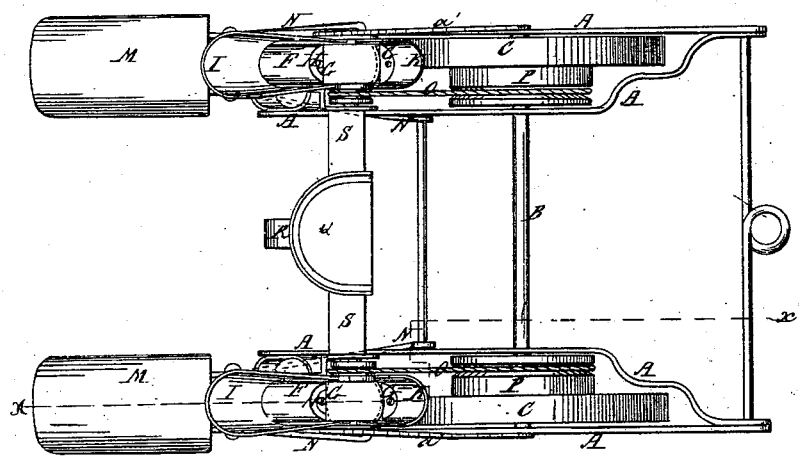
Witnesses
E. Wolff
Wm. A. Morgan
Inventor
Dr. James Musgrave
 pr. Munn & Co.
   Attys

UNITED STATES PATENT OFFICE.

JAMES MUSGRAVE, OF NEW CUMBERLAND, WEST VIRGINIA.

IMPROVEMENT IN SEED-PLANTERS.

Specification forming part of Letters Patent No. 84,751, dated December 8, 1868.

*To all whom it may concern:*

Be it known that I, JAMES MUSGRAVE, of New Cumberland, in the county of Hancock and State of West Virginia, have invented a new and useful Improvement in Seed-Planters; and I do hereby declare that the following is a full, clear, and exact description thereof, which will enable those skilled in the art to make and use the same, reference being had to the accompanying drawings, forming part of this specification, in which—

Figure 1 is a detail vertical longitudinal section of my improved machine, taken through the line $x\ x$, Fig. 2. Fig. 2 is a top or plan view of the same.

Similar letters of reference indicate corresponding parts.

My invention has for its object to furnish an improved seed-planter which shall be simple in construction, effective in operation, easily adjusted to plant different-sized seeds at different distances apart, and to cover the seeds at any desired depth; and it consists in the construction and combination of the various parts of the machine, as hereinafter more fully described.

A is the frame of the machine, which rides upon and is pivoted to the axle B, to which the drive-wheels C are attached in the ordinary manner. D are bars attached to the rear part of the frame A in a slightly inclined position, and which are further secured in position by the braces $a'$, as shown in Fig. 1. At the upper and lower ends of the bars D are pivoted rollers or pulleys E, around which pass the endless belts F. To the belts F are attached brackets G, to which are attached buckets H, having cavities in their upper ends to receive the seed to be planted.

The buckets H are detachable, so that they may be removed when desired and replaced with buckets having different-sized cavities, according to the kind of seed to be planted and the amount of seed required for each hill.

I are the hoppers which receive the seed, and which are attached to the upper part of the rear side of the bars D. J are spouts or tubes leading up from the lower part of the bars D to the bottom of the hoppers I, and which are of such a size that the buckets H, when passing up through them to the hoppers I, may fit so exactly that no seed can enter between said buckets and the said tubes.

The buckets H should be so arranged upon the belts F and the tubes J should be of such a length that two of said buckets may always be in each of said tubes at the same time. As the buckets H pass over the upper roller, E, the seed is discharged from the said buckets into the spout or tube K, which descends along the forward side of the bars D, and by which the seed is conducted into the bottom of the furrow in the rear of the plows L. The plows L are securely attached to the lower part of the bars D, and are formed with side wings or mold-boards of such a form as to prevent the sides of the furrows from falling in before the seed has been deposited in the bottom of said furrows.

M are the coverers, which are made in about the shape shown in the drawings—that is to say, in somewhat the form of a section of a flattened cone. N are bars or rods, the forward ends of which are pivoted to the frame A, and the rear ends of which are rigidly attached to the coverers M.

The bars or rods N pass through keepers attached to the plows L, or are secured to said plows by bolts and nuts, said bolts passing through slots in the sides of said plows, so that the coverers M may be allowed to play freely, pressing in the sides of the furrows and covering the seeds simply by their own weight, or so that they may be rigidly connected with said plows and adjusted so as to cover the seed to any desired depth.

The rollers E are driven to carry the endless belts of buckets F G by the belts O, which pass around pulleys formed upon or attached to the upper rollers, E, and around the pulleys P attached to the sides of the drive-wheel C, as shown in Figs. 1 and 2.

Q is the driver's seat, which is attached to the upper part of the spring or support R, the lower part of which is attached to the bar S, the ends of which rest and slide upon the side bars of the frame A, so that the seat Q may be moved forward or back, thus regulating the depth of the furrows by the position of the driver.

For convenience in turning around or passing from place to place, the driver, by stepping upon the part of the machine in front of the axle B, can depress the front part of the frame A, raising the plows away from the ground, the tongue being so attached to the machine as not to interfere with this movement, while at the same time limiting its extent.

I claim as new and desire to secure by Letters Patent—

1. Detachably securing the buckets H to the belts F by means of the brackets G, substantially as herein shown and described, and for the purpose set forth.

2. The combination of the tube J with the hopper I and buckets H, substantially as herein shown and described, and for the purpose set forth.

JAMES MUSGRAVE.

Witnesses:
W. L. BIGHAM,
SIMPSON O'BRIEN.